(12) United States Patent
Semper (10) Patent No.: US 8,118,213 B2
(45) Date of Patent: Feb. 21, 2012

(54) INDIRECT MOBILE CODES WITH FLEXIBLE FORMATS

(75) Inventor: William J. Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 12/462,015

(22) Filed: Jul. 28, 2009

(65) Prior Publication Data

US 2010/0235541 A1 Sep. 16, 2010

Related U.S. Application Data

(60) Provisional application No. 61/209,928, filed on Mar. 12, 2009.

(51) Int. Cl.
*G06F 17/00* (2006.01)
(52) U.S. Cl. ............... 235/375; 370/338; 455/435.1
(58) Field of Classification Search .............. 235/375; 370/338; 455/435.1
See application file for complete search history.

(56) References Cited

U.S. PATENT DOCUMENTS

| 6,064,307 | A  | * | 5/2000  | Silver ..................... 340/573.1 |
| 2005/0025300 | A1 |   | 2/2005  | Lagadec et al. |
| 2005/0182653 | A1 | * | 8/2005  | Urban et al. ............ 705/2 |
| 2005/0259658 | A1 |   | 11/2005 | Logan et al. |
| 2007/0220617 | A1 | * | 9/2007  | Yoo et al. ............... 726/32 |
| 2007/0229264 | A1 |   | 10/2007 | Eveland |
| 2008/0267173 | A1 |   | 10/2008 | Kemen et al. |
| 2010/0081434 | A1 | * | 4/2010  | Ahluwalia ............ 455/435.1 |
| 2010/0177752 | A1 | * | 7/2010  | Aggarwal et al. ....... 370/338 |

OTHER PUBLICATIONS

International Search Report dated Aug. 30, 2010 in connection with International Patent Application No. PCT/KR2010/000818.

\* cited by examiner

*Primary Examiner* — Allyson Trail (57) ABSTRACT

A method of operating a code clearing house is provided. The method comprises receiving an indirect mobile code from a mobile code client. The indirect mobile code comprises a length field, a routing prefix, and an identification code. The method further comprises determining the routing prefix in the indirect mobile code using the length field.

20 Claims, 6 Drawing Sheets

INDIRECT MOBILE CODES WITH FLEXIBLE FORMATS

CROSS-REFERENCE TO RELATED APPLICATION(S) AND CLAIM OF PRIORITY

The present application is related to U.S. Provisional Patent Application No. 61/209,928, filed Mar. 12, 2009, entitled "FLEXIBLE INDIRECT MOBILE CODE FORMATS". Provisional Patent Application No. 61/209,928 is assigned to the assignee of the present application and is hereby incorporated by reference into the present application as if fully set forth herein. The present application hereby claims priority under 35 U.S.C. §119(e) to U.S. Provisional Patent Application No. 61/209,928.

TECHNICAL FIELD OF THE INVENTION

The present application relates generally to wireless communications and, more specifically, to mobile codes used in wireless communications.

BACKGROUND OF THE INVENTION

Mobile codes are rapidly gaining in popularity as a useful application for wireless technology. Mobile codes may be coded into a printed barcode or a two dimensional barcode, which can be scanned by a camera-equipped handset or other scanning device. The scanning device uses the information contained within a mobile code to obtain a network address of a network entity, such a server on the Internet, that retrieves information associated with the mobile code. Upon retrieving the information, the network entity forwards the information to the scanning device. Such a mobile code is frequently referred to as a direct mobile code because the mobile code contains that network address of the entity that will return the information to the scanning device.

An indirect mobile code is a mobile code that does not point directly to a network address, but rather contains information that will lead to a Code Resolution Server (CRS). An indirect mobile code typically contains two parts: an identification code that is specific to the particular item being scanned, and a routing prefix that points to a CRS responsible for resolving the identification code. A mobile device scans an indirect mobile code and forwards the indirect mobile code to a Code Clearing House (CHC). The CHC determines the CRS associated with the routing prefix contained in the indirect mobile code and forwards the identification code in the indirect mobile code to the associated CRS for processing.

SUMMARY OF THE INVENTION

A method of operating a code clearing house is provided. The method comprises receiving an indirect mobile code from a mobile code client. The indirect mobile code comprises a length field, a routing prefix, and an identification code. The method further comprises determining the routing prefix in the indirect mobile code using the length field.

A code clearing house is provided. The code clearing house comprises a receiver configured to receive an indirect mobile code from a mobile code client. The indirect mobile code comprises a length field, a routing prefix, and an identification code. The code clearing house further comprises a processor configured to determine the routing prefix in the indirect mobile code using the length field and to associate the routing prefix with a code resolution server.

A mobile code client is provided. The mobile code client is capable of obtaining an indirect mobile code. The indirect mobile code comprises a length field, a routing prefix, and an identification code. The mobile code client is further capable of transmitting the indirect mobile code to a code clearing house. The length field is used by the code clearing house to determine the length of the routing prefix.

A code clearing house is provided. The code clearing house comprises a receiver configured to receive an indirect mobile code from a mobile code client, and a first connection to a first code resolution server. The first code resolution server is associated with a first routing prefix. The code clearing house further comprises a second connection to a second code resolution server. The second code resolution server is associated with a second routing prefix. The length of the first routing prefix is longer than the length of the second routing prefix, and the code clearing house is configured to associate the first routing prefix with the first code resolution server and the second routing prefix with the second code resolution server.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system.

Figure 1:
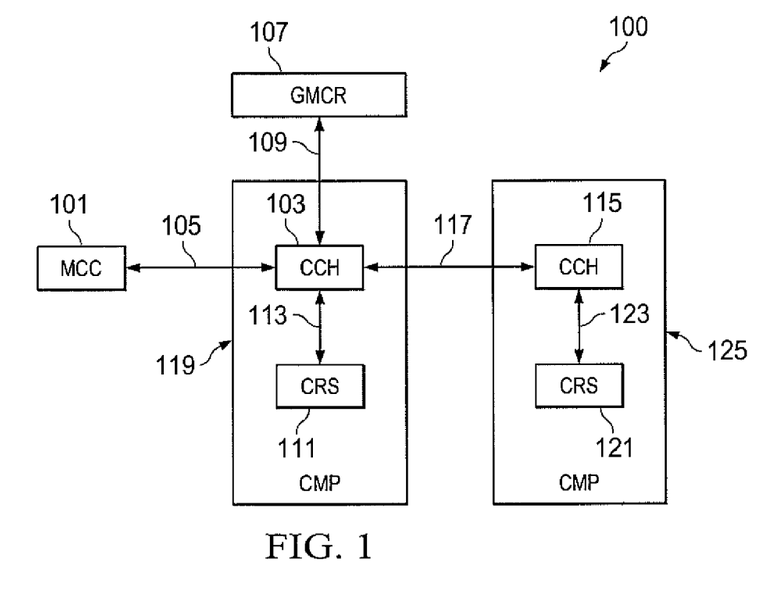
FIG. 1 illustrates a mobile code support system for utilizing an indirect mobile code according to an embodiment of the disclosure.

FIG. 1 illustrates a mobile code support system 100 for utilizing an indirect mobile code according to an embodiment of the disclosure. The embodiment of the system 100 illustrated in FIG. 1 is for illustration only. Other embodiments of the system 100 could be used without departing from the scope of this disclosure.

As shown in FIG. 1, a Mobile Code Client or MCC 101 is a mobile device for capturing an indirect mobile code. MCC 101 may capture an indirect mobile code, for example, by a camera feature on the MCC 101. Of course, one of ordinary skill in the art will recognize that any means of capturing an indirect mobile code by the MCC 101 could be utilized. Upon capturing an indirect mobile code, the MCC 101 transmits the indirect mobile code to a Code Clearing House or CCH 103 via a network connection 105.

The CCH 103 then reads the routing prefix in the indirect mobile code. If the routing prefix is associated with a Code Resolution Server or CRS 111, the CCH 103 transmits the identification code in the indirect code directly to the CRS 111 via a network connection 113. The CRS 111 then returns the data associated with the identification code to the CCH 103, and the CCH 103 transmits the data to the MCC 101. In this embodiment, the CCH 103 and the CRS 111 form a code management platform or CMP 119. Although shown as two separate entities, in some embodiments, the CRS 111 could be contained within the CCH 103.

If the routing prefix is associated with another code resolution server, such as a CRS 121, the CCH 103 transmits the indirect mobile code to a code clearing house, such as a CCH 115, associated with the CRS 121 via a network connection 117. In such a case, the CCH 115 transmits the identification code in the indirect code to the CRS 121 via a network connection 123. The CRS 121 then returns the data associated with the identification code to the CCH 115. The CCH 115 then transmits the data to CCH 103, and the CCH 103 transmits the data to the MCC 101. In this embodiment, the CCH 115 and the CRS 121 form a CMP 125. Although shown as two separate entities, in some embodiments, the CRS 121 could be contained within the CCH 115.

If the CCH 103 cannot determine a code resolution server associated with the routing prefix, the CCH 103 transmits the indirect mobile code to a Global Mobile Code Registry or GMCR 107 via a network connection 109. The GMCR 107 then returns the data associated with the indirect mobile code to the CCH 103, and the CCH 103 transmits the data to the MCC 101.

Figure 2:
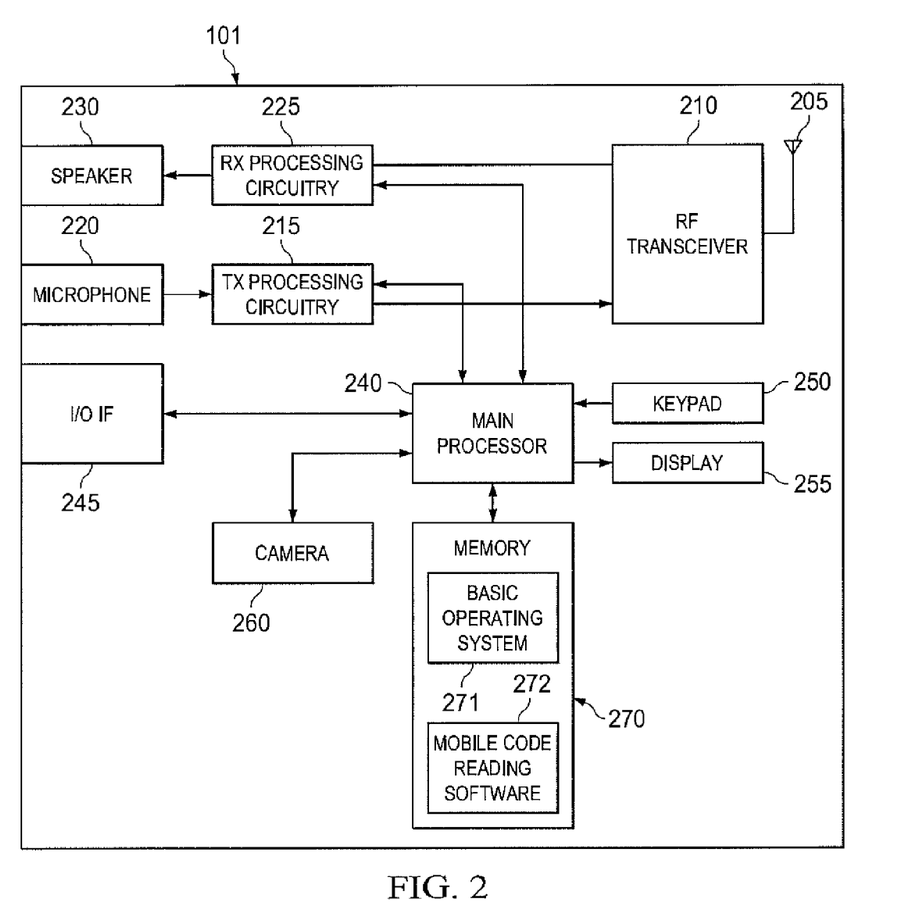
FIG. 2 illustrates a mobile code client (MCC) in greater detail according to an embodiment of the disclosure.

FIG. 2 illustrates the mobile code client (MCC) 101 in greater detail according to an embodiment of the disclosure. The embodiment of the MCC 101 illustrated in FIG. 2 is for illustration only. Other embodiments of the MCC 101 could be used without departing from the scope of this disclosure.

As shown in FIG. 2, the MCC 101 comprises an antenna 205, a radio frequency (RF) transceiver 210, a transmit (TX) processing circuitry 215, a microphone 220, and a receive (RX) processing circuitry 225. The MCC 101 also comprises a speaker 230, a main processor 240, an input/output (I/O) interface (IF) 245, a keypad 250, a display 255, a camera 260, and a memory 270. The memory 270 further comprises a basic operating system (OS) program 271 and a mobile code reading software 272 that is executed by the main processor 240 to capture an indirect mobile code, for example, by the camera 260.

The radio frequency (RF) transceiver 210 receives from the antenna 205 an incoming RF signal transmitted by a network base station. The radio frequency (RF) transceiver 210 down-converts the incoming RF signal to produce an intermediate frequency (IF) or a baseband signal. The IF or baseband signal is sent to the receiver (RX) processing circuitry 225 that produces a processed baseband signal by filtering, decoding, and/or digitizing the baseband or IF signal. The receiver (RX) processing circuitry 225 transmits the processed baseband signal to the speaker 230 (i.e., voice data) or the main processor 240 for further processing (e.g., web browsing).

The transmitter (TX) processing circuitry 215 receives analog or digital voice data from the microphone 220 or other outgoing baseband data (e.g., web data, e-mail, interactive video game data) from the main processor 240. The transmitter (TX) processing circuitry 215 encodes, multiplexes, and/or digitizes the outgoing baseband data to produce a processed baseband or IF signal. The radio frequency (RF) transceiver 210 receives the outgoing processed baseband or IF signal from the transmitter (TX) processing circuitry 215. The radio frequency (RF) transceiver 210 up-converts the baseband or IF signal to a radio frequency (RF) signal that is transmitted via the antenna 205.

In some embodiments of the disclosure, the main processor 240 is a microprocessor or microcontroller. The memory 270 is coupled to the main processor 240. According to some embodiments of the disclosure, a part of the memory 270 comprises a random access memory (RAM) and another part of the memory 270 comprises a Flash memory that acts as a read-only memory (ROM).

The main processor 240 executes a basic operating system (OS) program 271 stored in the memory 270 in order to control the overall operation of MCC 101. In one such operation, the main processor 240 controls the reception of forward channel signals and the transmission of reverse channel signals by the radio frequency (RF) transceiver 210, the receiver (RX) processing circuitry 225, and the transmitter (TX) processing circuitry 215 in accordance with well-known principles.

The main processor 240 is capable of executing other processes and programs resident in the memory 270. The main processor 240 can move data into or out of the memory 270 as required by an executing process. In some embodiments, the main processor 240 is configured to receive an indirect mobile code captured by the camera 260 and sends the indirect mobile code to the transmitter (TX) processing circuitry 215 for processing and transmission to a code clearing house. The main processor 240 also is coupled to the I/O interface 245. The I/O interface 245 provides the MCC 101 with the ability to connect to other devices such as laptop computers and handheld computers. The I/O interface 245 is the communication path between these accessories and the main processor 240.

Main processor 240 also is coupled to the keypad 250 and the display unit 255. The operator of the MCC 101 uses the keypad 250 to enter data into the MCC 101. The display 255 may be a liquid crystal display (LCD) capable of rendering text and/or at least limited graphics from web sites. Alternate embodiments may use other types of displays.

Figure 3:
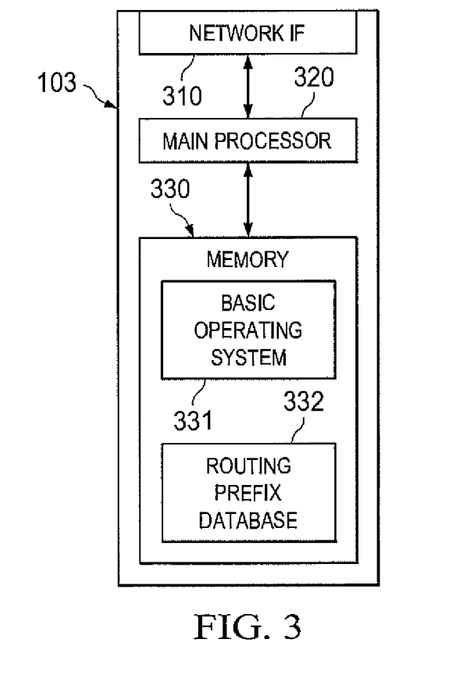
FIG. 3 illustrates a code clearing house (CCH) in greater detail according to an embodiment of the disclosure.

FIG. 3 illustrates the code clearing house (CCH) 103 in greater detail according to an embodiment of the disclosure. The embodiment of the CCH 103 illustrated in FIG. 3 is for illustration only. Other embodiments of the CCH 103 could be used without departing from the scope of this disclosure.

As shown in FIG. 3, the CCH 103 comprises an I/O interface 310, a main processor 320, and a memory 330. The I/O interface 310 provides the CCH 103 with the ability to connect to other devices such as laptop computers and handheld computers. The I/O interface 310 is the communication path between these accessories and the main processor 320. In a particular embodiment, the I/O interface 310 is a network interface that allows the CCH 103 to receive an indirect mobile code from the MCC 101.

In some embodiments of the disclosure, the main processor 320 is a microprocessor or microcontroller. The memory 330 is coupled to the main processor 320. The main processor 320 executes a basic operating system (OS) program 331 stored in the memory 330 in order to control the overall operation of the CCH 103. The memory 330 also comprises a routing prefix database 332 used by the main processor 320 in determining the entity to which an indirect mobile code is to be sent.

Figure 4:
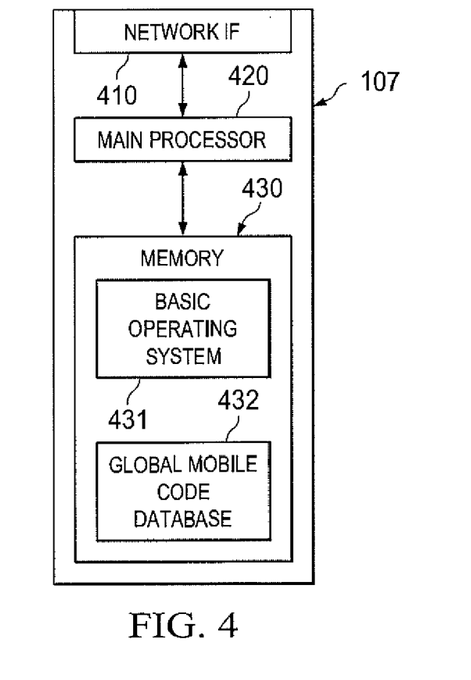
FIG. 4 illustrates a global mobile code registry (GMCR) in greater detail according to an embodiment of the disclosure.

FIG. 4 illustrates the global mobile code registry (GMCR) 107 in greater detail according to an embodiment of the disclosure. The embodiment of the GMCR 107 illustrated in FIG. 4 is for illustration only. Other embodiments of the GMCR 107 could be used without departing from the scope of this disclosure.

As shown in FIG. 4, the GMCR 107 comprises an I/O interface 410, a main processor 420, and a memory 430. The I/O interface 410 provides the GMCR 107 with the ability to connect to other devices such as laptop computers and handheld computers. The I/O interface 410 is the communication path between these accessories and the main processor 420. In a particular embodiment, the I/O interface 410 is a network interface that allows the GMCR 107 to receive an indirect mobile code from the CCH 103.

In some embodiments of the disclosure, the main processor 420 is a microprocessor or microcontroller. The memory 430 is coupled to the main processor 420. The main processor 420 executes a basic operating system (OS) program 431 stored in the memory 430 in order to control the overall operation of the GMCR 107. The memory 430 also comprises a global mobile code database 432 used by the main processor 420 to resolve an indirect mobile code received from CCH 103.

Figure 5:
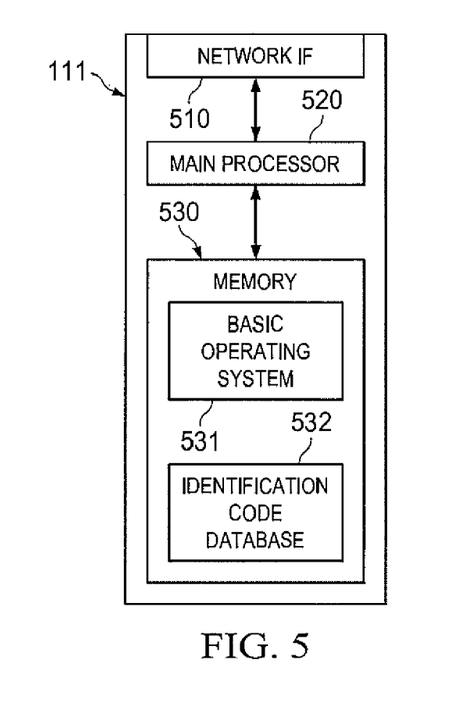
FIG. 5 illustrates a code resolution server (CRS) in greater detail according to an embodiment of the disclosure.

FIG. 5 illustrates the code resolution server (CRS) 111 in greater detail according to an embodiment of the disclosure. The embodiment of the CRS 111 illustrated in FIG. 5 is for illustration only. Other embodiments of the CRS 111 could be used without departing from the scope of this disclosure.

As shown in FIG. 5, the CRS 111 comprises an I/O interface 510, a main processor 520, and a memory 530. The I/O interface 510 provides the CRS 111 with the ability to connect to other devices such as laptop computers and handheld computers. The I/O interface 510 is the communication path between these accessories and the main processor 520. In a particular embodiment, the I/O interface 510 is a network interface that allows the CRS 111 to receive an indirect mobile code from the CCH 103.

In some embodiments of the disclosure, the main processor 520 is a microprocessor or microcontroller. The memory 530 is coupled to the main processor 520. The main processor 520 executes a basic operating system (OS) program 531 stored in the memory 530 in order to control the overall operation of the CRS 111. The memory 530 also comprises an identification code database 532 used by the main processor 520 to resolve an identification code received from CCH 103.

Indirect mobile codes that require the routing prefix and the identification code be of a fixed length for all indirect mobile codes captured by an MCC does not allow the CCH to determine the length of either the routing prefix or identification code from the indirect mobile code. Such a restriction creates an artificial limitation on the way routing prefixes and identification codes can be used. Since a routing prefix is mapped to a single code resolution server (operated by a third party vendor, for example), all identification codes associated with that routing prefix are restricted from being used by any other code resolution server. In some cases, the vendor operating the code resolution server may not have the need to host all of the identification codes available for the routing prefix. Also, another vendor may need to host more identification codes than is allowed by the limit imposed by the length of the identification code field. Because the length of the identification codes is fixed, all code resolution servers host the same number of identification codes.

This disclosure provides a more flexible and robust way of processing indirect mobile codes by a code clearing house, such as CCH 103. Specifically, a method and system is disclosed that allows for utilizing indirect mobile codes having routing prefixes and identifications codes of variable lengths.

Figure 6:
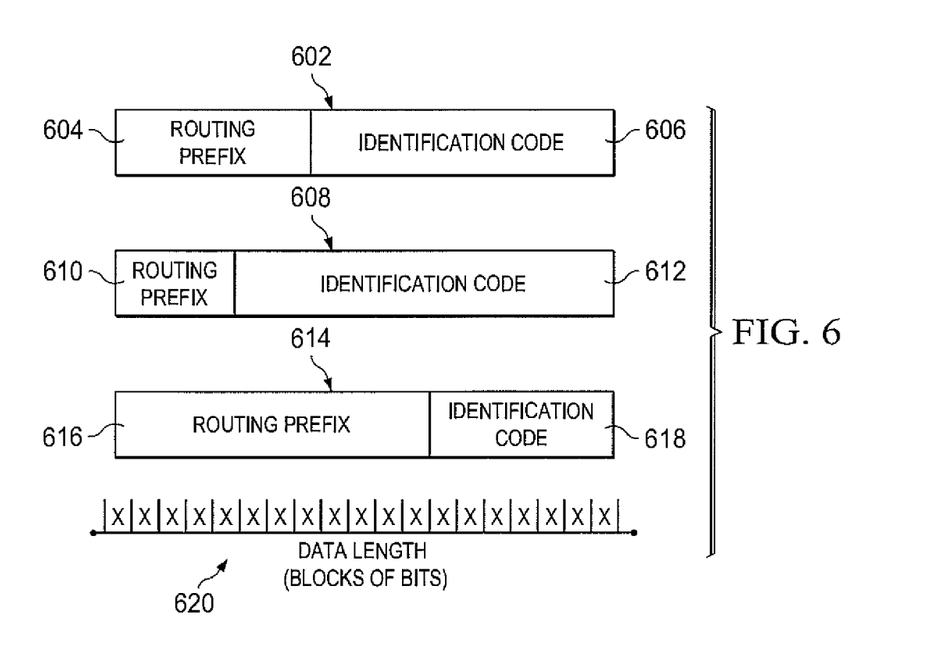
FIG. 6 illustrates indirect mobile codes having flexible formats according to an embodiment of the disclosure.

FIG. 6 illustrates indirect mobile codes having flexible formats according to an embodiment of the disclosure. The indirect mobile codes illustrated in FIG. 6 are for illustration only. Other embodiments of the indirect mobile codes could be used without departing from the scope of this disclosure.

As shown in FIG. 6, a first indirect mobile code 602 has a total data length 620 of bits to be used for both the routing prefix and the identification code. In this case, the length of a routing prefix 604 and the length of an identification code 606 is set and is not variable in order for a code clearing house to be able to locate the routing prefix and the identification code in the indirect mobile code. Therefore, the number of identification codes hosted by a code resolution server utilizing such an indirect mobile code is set and cannot be changed regardless of the number of identification codes that are actually used or may be needed by the code resolution server.

FIG. 6 also shows a second indirect mobile code 608 having a routing prefix 610 and an identification code 612. In the second indirect mobile code 608, the routing prefix 610 is shorter in length than the routing prefix 604 utilized in the first mobile code 602. Having a shorter routing prefix allows more bits to be used for the identification code. Having more bits allocated to the identification code allows more identification codes to be generated and utilized. The second mobile code 608 is particularly useful for code resolution servers that need more identification codes than is available using indirect mobile codes with a fixed-length routing prefix and identification code.

FIG. 6 also shows a third indirect mobile code 614 having a routing prefix 616 and an identification code 618. In the third indirect mobile code 614, the routing prefix 616 is longer in length than the routing prefix 604 utilized in the first mobile code 602. Having a longer routing prefix allows less bits to be used for the identification code. Having less bits allocated to the identification code allows less identification codes to be generated and utilized. The third indirect mobile code 614 is particularly useful for code resolution servers that do not need all of identification codes that are available using indirect mobile codes with a fixed-length routing prefix and identification code. The routing prefix 616 can be priced differently than a longer routing prefix because such a routing prefix would host a smaller number of identification codes.

Figure 7:
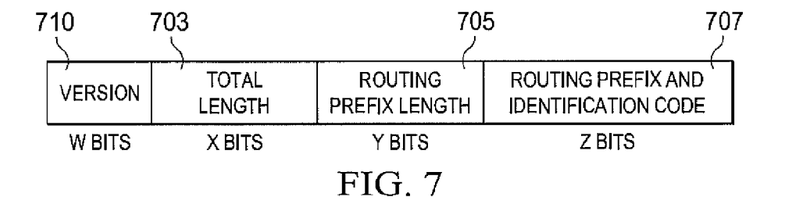
FIG. 7 illustrates a format for an indirect mobile code according to an embodiment of the disclosure.

FIG. 7 illustrates a format 700 for an indirect mobile code according to an embodiment of the disclosure. The format 700 illustrated in FIG. 7 is for illustration only. Other embodiments of the format 700 could be used without departing from the scope of this disclosure.

As shown in FIG. 7, the format 700 contains a version field 701 that is W bits long, a total length field 703 that is X bits long, a routing prefix length field 705 that is Y bits long, and a routing prefix and identification code field 707 that is Z bits long. Because the indirect mobile codes of this disclosure utilize routing prefixes and identification codes that are variable in length, the routing prefix length field 705 is included so that a code clearing house can use the routing prefix length field 705 to determine the routing prefix and the identification code in the routing prefix and identification code field 707. Of course the length of the routing prefix also may be indirectly determined by providing the length of the identification code instead of the routing prefix length.

The disclosed flexible formats for indirect mobile codes allows for a flexible deployment of a mobile code support system with the possibility of several different code resolution servers attached to a network of code clearing houses.

Figure 8:
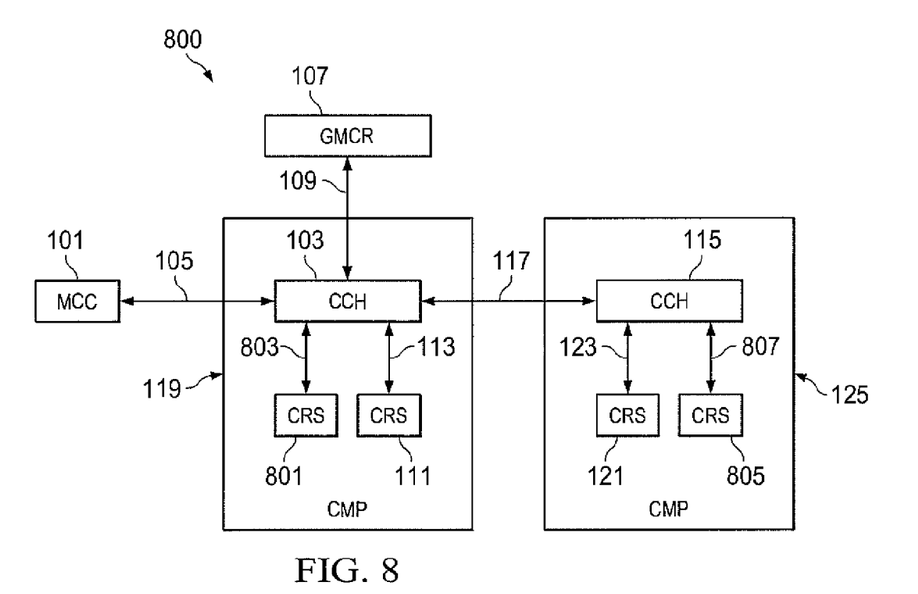
FIG. 8 illustrates a mobile code support system for utilizing an indirect mobile code having a flexible format according to another embodiment of the disclosure.

FIG. 8 illustrates a mobile code support system 800 for utilizing an indirect mobile code having a flexible format according to another embodiment of the disclosure. The embodiment of the system 800 illustrated in FIG. 8 is for illustration only. Other embodiments of the system 800 could be used without departing from the scope of this disclosure.

As shown in FIG. 8, the CCH 103 also is connected to a second CRS 801 via a network connection 803. In some embodiments, the CRS 801 may be associated with a routing prefix that is of a different length than the routing prefix associated with the CRS 111.

Similarly, the CCH 115 also is connected to a second CRS 805 via a network connection 807.

Although FIG. 8 shows CCH 103 and CCH 115 being connected to two code resolution servers, one of ordinary skill in the art will recognize that the code clearing houses can be connected to any number of code resolution servers as well as other code clearing houses.

Figure 9:
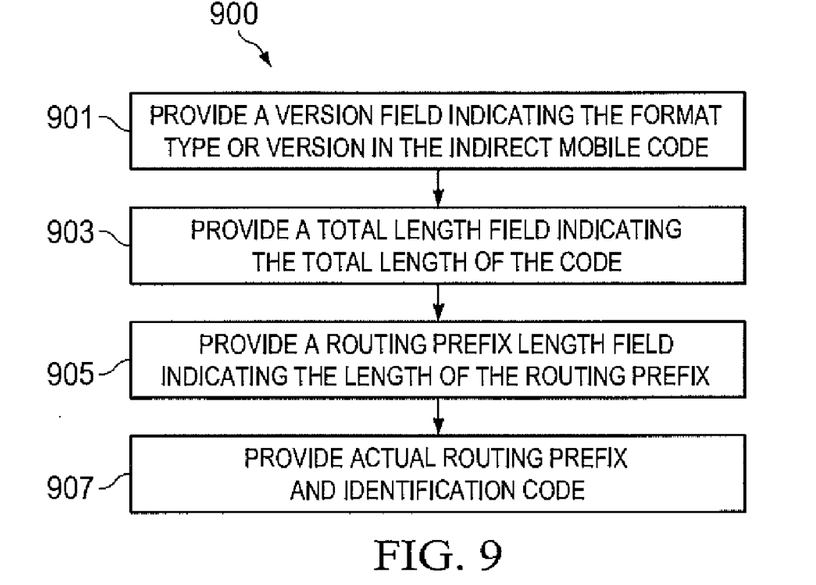
FIG. 9 illustrates a method of coding a mobile code having a flexible format according to an embodiment of the disclosure.

FIG. 9 illustrates a method 900 of coding a mobile code having a flexible format according to an embodiment of the disclosure. The method 900 illustrated in FIG. 9 is for illustration only. Other embodiments of the method 900 could be used without departing from the scope of this disclosure.

As shown in FIG. 9, the method 900 comprises providing a version field indicating the format type or version in the indirect mobile code (block 901). The method 900 further comprises providing a total length field indicating the total length of the code (i.e., the length of the identification code plus the length of the routing prefix) (block 903), and providing a routing prefix length field indicating the length of the routing prefix (block 905). The actual routing prefix and identification code are also provided (block 907). In another embodiment, the length of the identification code can be used instead of the length of the routing prefix at block 905.

Figure 10:
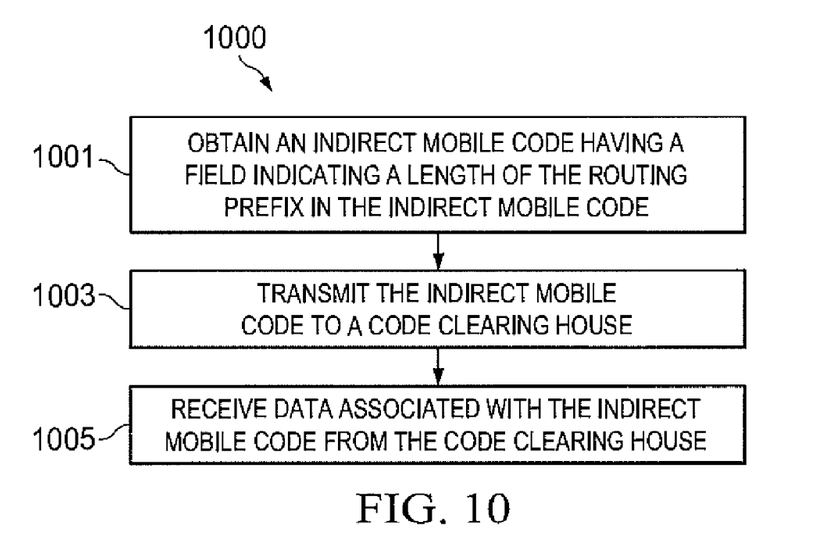
FIG. 10 illustrates a method of operating a mobile code client (MCC) according to an embodiment of the disclosure.

FIG. 10 illustrates a method 1000 of operating a mobile code client or MCC according to an embodiment of the disclosure. The method 1000 illustrated in FIG. 10 is for illustration only. Other embodiments of the method 1000 could be used without departing from the scope of this disclosure.

As shown in FIG. 10, an MCC obtains an indirect mobile code having a field indicating a length of the routing prefix in the indirect mobile code (block 1001) and transmits the indirect mobile code to a code clearing house (block 1003). The MCC then receives data associated with the indirect mobile code from the code clearing house (block 1005).

Figure 11:
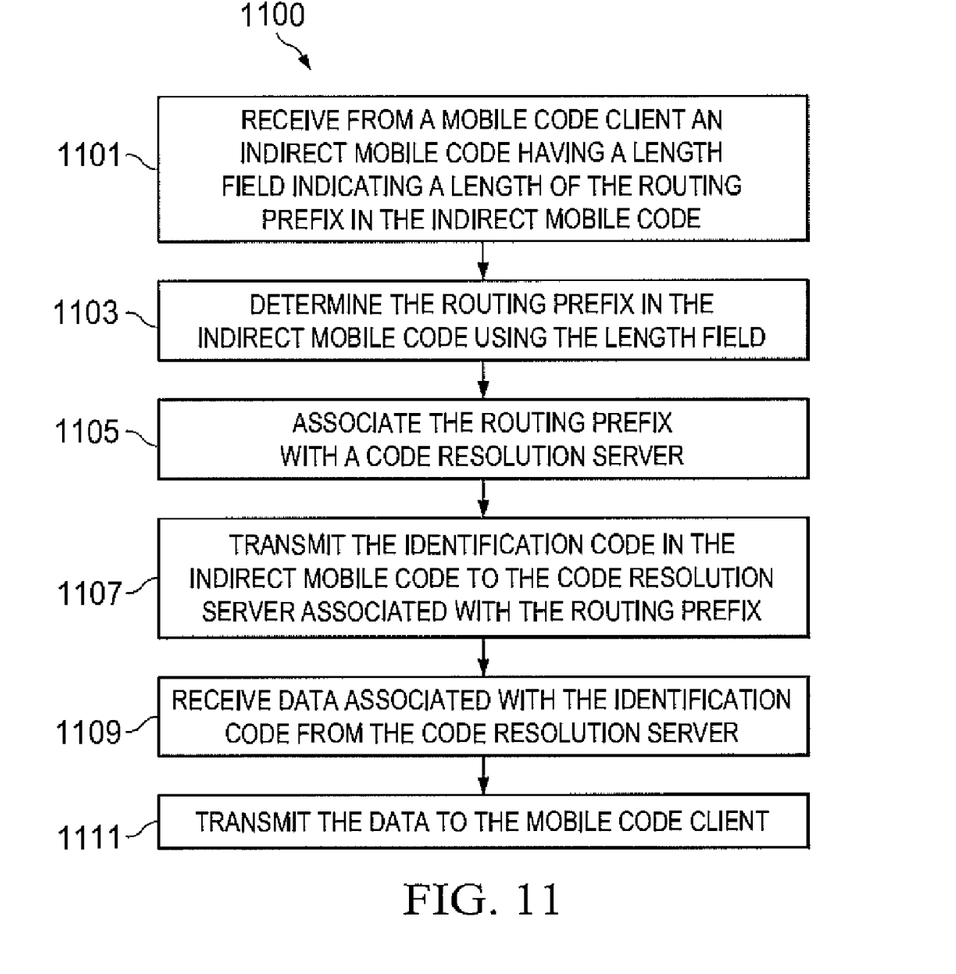
FIG. 11 illustrates a method of operating a code clearing house (CCH) according to an embodiment of the disclosure.

FIG. 11 illustrates a method 1100 of operating a code clearing house or CCH according to an embodiment of the disclosure. The method 1100 illustrated in FIG. 11 is for illustration only. Other embodiments of the method 1100 could be used without departing from the scope of this disclosure.

As shown in FIG. 11, a CCH receives from a mobile code client an indirect mobile code having a length field indicating a length of the routing prefix in the indirect mobile code (block 1101). In an alternative embodiment, the length field indicates a length of the identification code in the indirect mobile code at block 1101. The CCH determines the routing prefix in the indirect mobile code using the length field (block 1103). The CCH associates the routing prefix with a code resolution server (block 1105), and transmits the identification code in the indirect mobile code to the code resolution server associated with the routing prefix (block 1107). The CCH then receives data associated with the identification code from the code resolution server (block 1109), and transmits the data to the mobile code client (block 1111).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a code clearing house comprising:
    receiving an indirect mobile code from a mobile code client, the indirect mobile code comprising a length field, a routing prefix, and an identification code; and
    determining the routing prefix in the indirect mobile code using the length field.

2. A method in accordance with claim 1 further comprising:
    associating the routing prefix with a code resolution server; and
    transmitting the identification code in the indirect mobile code to the code resolution server associated with the routing prefix.

3. A method in accordance with claim 2 further comprising:
    receiving data associated with the identification code from the code resolution server; and
    transmitting the data to the mobile code client.

4. A method in accordance with claim 1 wherein the length field indicates a length of the routing prefix.

5. A method in accordance with claim 1 wherein the length field indicates a length of the identification code.

6. A method in accordance with claim 1 wherein the indirect mobile code further comprises a version field and a total length field, the total length field indicating the total length of the routing prefix and the identification code.

7. A code clearing house comprising:
    a receiver configured to receive an indirect mobile code from a mobile code client, the indirect mobile code comprising a length field, a routing prefix, and an identification code; and a processor configured to determine the routing prefix in the indirect mobile code using the length field and to associate the routing prefix with a code resolution server.

8. A code clearing house in accordance with claim 7 further comprising:
a transmitter configured to transmit the identification code in the indirect mobile code to the code resolution server associated with the routing prefix.

9. A code clearing house in accordance with claim 8 wherein the receiver is further configured to receive data associated with the identification code from the code resolution server, and the transmitter is further configured to transmit the data to the mobile code client.

10. A code clearing house in accordance with claim 7 wherein the length field indicates a length of the routing prefix.

11. A code clearing house in accordance with claim 7 wherein the length field indicates a length of the identification code.

12. A code clearing house in accordance with claim 7 wherein the indirect mobile code further comprises a version field and a total length field, the total length field indicating the total length of the routing prefix and the identification code.

13. A mobile code client capable of:
obtaining an indirect mobile code, the indirect mobile code comprising a length field, a routing prefix, and an identification code; and
transmitting the indirect mobile code to a code clearing house,
wherein the length field is used by the code clearing house to determine the length of the routing prefix.

14. A mobile code client in accordance with claim 13 wherein the length field indicates a length of the routing prefix.

15. A mobile code client in accordance with claim 13 wherein the length field indicates a length of the identification code.

16. A mobile code client in accordance with claim 13 further comprising:
receiving data associated with the identification code.

17. A mobile code client in accordance with claim 13 wherein the indirect mobile code further comprises a version field and a total length field, the total length field indicating the total length of the routing prefix and the identification code.

18. A code clearing house comprising:
a receiver configured to receive an indirect mobile code from a mobile code client;
a first connection to a first code resolution server, the first code resolution server associated with a first routing prefix; and
a second connection to a second code resolution server, the second code resolution server associated with a second routing prefix,
wherein the length of the first routing prefix is longer than the length of the second routing prefix, and
wherein the code clearing house is configured to associate the first routing prefix with the first code resolution server and the second routing prefix with the second code resolution server.

19. A code clearing house in accordance with claim 18 wherein the indirect mobile code comprising a length field, a routing prefix, and an identification code, and
wherein the length field is used by the code clearing house to determine the length of the routing prefix in the indirect mobile code.

20. A code clearing house in accordance with claim 19 wherein the code clearing house is further configured to determine if the routing prefix in the indirect mobile code matches either the first routing prefix or the second routing prefix.

* * * * *